(12) United States Patent
Tanaka et al.

(10) Patent No.: US 11,327,719 B2
(45) Date of Patent: May 10, 2022

(54) RANDOM NUMBER GENERATION METHOD SELECTING SYSTEM, RANDOM NUMBER GENERATION METHOD SELECTING METHOD, AND RANDOM NUMBER GENERATION METHOD SELECTING PROGRAM

(71) Applicant: NEC Corporation, Tokyo (JP)

(72) Inventors: Yuki Tanaka, Tokyo (JP); Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 16/635,262

(22) PCT Filed: Aug. 7, 2017

(86) PCT No.: PCT/JP2017/028584
§ 371 (c)(1),
(2) Date: Jan. 30, 2020

(87) PCT Pub. No.: WO2019/030799
PCT Pub. Date: Feb. 14, 2019

(65) Prior Publication Data
US 2020/0371751 A1    Nov. 26, 2020

(51) Int. Cl.
*G06F 7/58* (2006.01)
(52) U.S. Cl.
CPC .................. *G06F 7/58* (2013.01)
(58) Field of Classification Search
CPC .................................................. G06F 7/58
See application file for complete search history.

(56) References Cited

U.S. PATENT DOCUMENTS 6,965,907 B2 * 11/2005 Klass ..................... G06F 7/588
                                                         708/255
7,752,247 B2 *  7/2010 Wilber .................... G06F 7/58
                                                         708/255
(Continued)

FOREIGN PATENT DOCUMENTS

JP    2000-276459 A    10/2000
JP    2014-216005 A    11/2014

OTHER PUBLICATIONS

International Search Report for PCT Application No. PCT/JP2017/028584, dated Sep. 5, 2017.

(Continued)

*Primary Examiner* — Michael D. Yaary
(74) *Attorney, Agent, or Firm* — Sughrue Mion, PLLC

(57) ABSTRACT

A generation means 11 generates a uniform random number between 0 and a first probability, which is a probability of a stochastic variable becoming a value within a predetermined interval in a positive range in the first discrete distribution. When a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, the selection means 12 selects, as a random number generation method, an accumulation method in which a functional value defining the second discrete distribution is used. When a uniform random number greater than the second probability is generated, the selection means 12 selects a rejection sampling method as the random number generation method.

8 Claims, 7 Drawing Sheets

(56) References Cited

U.S. PATENT DOCUMENTS

2009/0228238 A1* 9/2009 Mansinghka .......... G06N 7/005
                                                              702/181
2014/0321645 A1   10/2014 Koo et al.
2017/0220322 A1    8/2017 Vaish

OTHER PUBLICATIONS

Regev, "On lattices, learning with errors, random linear codes, and cryptography" STOC 2005, ACM, 2005, pp. 84-93, Israel.

Chris Peikert, "An efficient and parallel Gaussian Sampler for Lattices" CRYPTO, 2010, LNCS 6223, pp. 80-97, USA.

Craig Gentry, Chris Peikert, and Vinod Vaikuntanathan, "Trapdoors for Hard Lattices and New Cryptographic Constructions", STOC'08, May 17-20, 2008, pp. 197-206, Canada.

Nagarjun C. Dwarakanath, Steven D. Galbraith, "Sampling from discrete Gaussians for lattice-based cryptography on a constrained device" Appl. Algebra Engrg. Comm. Comput (2014) 25, pp. 159-180, Germany.

George Casella, Christian P. Robert, and Martin T. Wells, "Generalized Accept-Reject sampling schemes" A Festschrift for Herman Rubin Institute of Mathematical Statistics Lecture Notes—Monograph Series vol. 45, 2004, pp. 342-347, USA.

Yuki Tanaka et al., "Efficient Discrete Gaussian Sampling on Constrained Devices", IEICE Technical Report, Jul. 7, 2016, vol. 116, No. 132, pp. 169 to 175, Japan.

Japanese Office Action for JP Application No. 2019-535457 dated Mar. 16, 2021 with English Translation.

* cited by examiner

FIG. 10

| METHOD | AMOUNT OF MEMORY | VARIANCE VALUE | CENTER | Usage |
|---|---|---|---|---|
| LWE-plane | — | 50,000–100,000 | 0 | KEY GENERATION |
| LWE-dual | (8~10) * 128bit | 8–13 | 0 | CRYPTOGRAPHY PROCESS |
| GPV | 400 * 128bit | 21 | q-TYPE/1 SIGNATURE | SIGNATURE GENERATION |
| MP | 50 * 128bit | 17 | 2-TYPE/1 SIGNATURE | SIGNATURE GENERATION |
| Lyubashevsky | 50MB (at least) | 7,000–700,000 | 0 | SIGNATURE GENERATION |
| BLISS | — | 270–680 | 0 | SIGNATURE GENERATION |
| Bai-Galbraith | — | 15–560 | 0 | SIGNATURE GENERATION |

FIG. 11

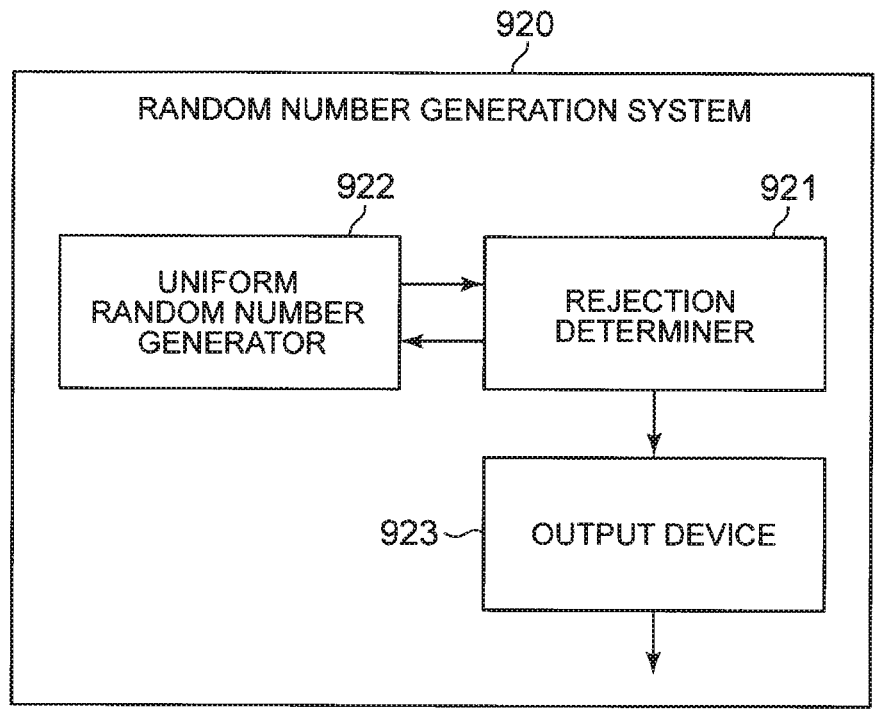

FIG. 12

Algorithm 1 GPV-algorithm

1: take $\vec{b}_1, \cdots, \vec{b}_n$, and $\sigma, \vec{c}$

2: $\vec{\tilde{b}}_1, \cdots, \vec{\tilde{b}}_n \leftarrow$ Gram-Schmidt matrix of $\vec{b}_1, \cdots, \vec{b}_n$ 3: $\vec{c}_n \leftarrow \vec{c}, \vec{v}_n \leftarrow 0$ 4: for i = n to 1 do

5: $\quad c'_i \leftarrow \langle \vec{c}_i, \vec{\tilde{b}}_i \rangle / \|\vec{\tilde{b}}_i\|^2$ 6: $\quad \sigma_i \leftarrow \sigma / \|\vec{\tilde{b}}_i\|$ 7: $\quad z_i \leftarrow D_{Z, c'_i, \sigma_i}$ 8: $\quad \vec{c}_{i-1} \leftarrow \vec{c}_i - z_i \vec{b}_i$ 9: $\quad \vec{v}_{i-1} \leftarrow \vec{v}_i + z_i \vec{b}_i$ 10: end for

11: Return $\vec{v}_0$

RANDOM NUMBER GENERATION METHOD SELECTING SYSTEM, RANDOM NUMBER GENERATION METHOD SELECTING METHOD, AND RANDOM NUMBER GENERATION METHOD SELECTING PROGRAM

This application is a National Stage Entry of PCT/JP2017/028584 filed on Aug. 7, 2017, the contents of all of which are incorporated herein by reference, in their entirety.

TECHNICAL FIELD

The present invention relates to a random number generation method selecting system, a random number generation method selecting method, and a random number generation method selecting program, and particularly relates to a random number generation method selecting system, a random number generation method selecting method, and a random number generation method selecting program that are used in lattice-based cryptography and signature and generates a random number according to discrete Gaussian distribution the center of which is not an origin.

BACKGROUND ART

First, discrete Gaussian distribution will be defined. A function defined by a real number $s \in R$ (R is a symbol representing a set of all real numbers) is defined as follows.

[Expression 1]

$$\phi_s(x) := \frac{1}{s} \exp\left(-\frac{\pi}{s^2} x^2\right) \quad \text{Formula (1)}$$

A distribution in which an integer value $u \in Z$ (Z is a symbol representing a set of whole integers) is output with probability $\varphi_s(u)/\Sigma^{\infty}_{j=-\infty} \varphi_s(j)$ is referred to as discrete Gaussian distribution with a variance value s. As described in Non Patent Literature (NPL) 1, a random number generated in accordance with the above discrete Gaussian distribution is used for cryptography using a lattice (hereinafter referred to as lattice-based cryptography). Lattice-based cryptography is expected to be used as post-quantum cryptography. Furthermore, lattice-based cryptography is a cryptographic system that has been studied as a cryptographic scheme with high computational efficiency and high functionality.

The discrete Gaussian distribution is probability distribution that can output all integer values. However, when the random number generated in accordance with discrete Gaussian distribution are used for lattice-based cryptography, limiting the range of integer values output by the discrete Gaussian distribution would often increase efficiency in the generation of stochastic variables.

For example, limiting the range of integer values output by discrete Gaussian distribution in such a way that it depends on a security parameter $n \in N$ (N is a symbol representing a set of all natural numbers) would increase the efficiency in the generation of stochastic variables.

That is, setting $\{k \in Z | -t \cdot s \le k \le t \cdot s\}$ as an output range of the discrete Gaussian distribution with $t=\omega(\log n)^{1/2}$ would increase the efficiency in the generation of stochastic variables. Here, $\omega$ is a Landau symbol. It is generally known that limiting the range of integers output by discrete Gaussian distribution as described above would not affect the security of lattice-based cryptography.

When the normalization constant W is defined as $W = \Sigma^{t \cdot s}_{i=-t \cdot s} \varphi_s(i)$, the discrete Gaussian distribution in which the range of output integers is limited as described above is expressed as $\Psi_s(x) = \varphi_s(x)/W$. When $\Psi_s(x)$ is used, the integer value $u \in Z$ is output with probability $\Psi_s(u)$.

Hereinafter, the "discrete Gaussian distribution" in this specification will refer to probability distribution in which an output integer range is $\{k \in Z | -t \cdot s \le k \le t \cdot s\}$, and an integer value $u \in Z$ is output with probability $\Psi_s(u)$. Moreover, the function $\Psi_s(x) = \varphi_s(x)/W$ will be referred to as a function that defines discrete Gaussian distribution.

Next, the center of the discrete Gaussian distribution will be described. The discrete Gaussian distribution with the center c and the variance value s is probability distribution that outputs an integer value u with probability $\Psi_s(u-c)$.

The above is a definition for discrete Gaussian distribution on a one-dimensional lattice. Next, a definition for discrete Gaussian distribution on an n-dimensional lattice will be given.

A matrix in which vectors $\{\vec{b}_1, \ldots, \vec{b}_n\} \in R^n$ are arranged horizontally is denoted as B. An n-dimensional lattice $\Lambda(B)$ using the matrix B is defined as follows.

[Expression 2]

$$\Lambda(B) := \left\{ \sum_{i \in [n]} c_i \cdot \vec{b}_i \,\middle|\, c_i \in Z \right\} \quad \text{Formula (2)}$$

The Gaussian function on $R^n$ whose center is $\vec{c}$ is defined as follows using the parameter s.

[Expression 3]

$$\text{for all } \vec{x} \in R^n, \rho_{s,\vec{c}}(\vec{x}) = \exp\left(-\pi \frac{\|\vec{x} - \vec{c}\|^2}{s^2}\right) \quad \text{Formula (3)}$$

The discrete Gaussian distribution on the n-dimensional lattice $\Lambda$ is defined as follows using the Gaussian function expressed by the above Formula (3).

[Expression 4]

$$\text{for all } \vec{x} \in \Lambda, D_{\Lambda,s,\vec{c}}(\vec{x}) = \frac{\rho_{s,\vec{c}}(\vec{x})}{\rho_{s,\vec{c}}(\Lambda)} \quad \text{Formula (4)}$$

That is, the discrete Gaussian distribution on the n-dimensional lattice is probability distribution in which the stochastic variable follows the Formula (4). Hereinafter, for simplicity, the discrete Gaussian distribution on the one-dimensional lattice and the discrete Gaussian distribution on the n-dimensional lattice will also be referred to as one-dimensional discrete Gaussian distribution and an n-dimensional discrete Gaussian distribution, respectively.

The above is the definition of one-dimensional discrete Gaussian distribution and the definition of a multidimensional (n-dimensional) discrete Gaussian distribution. Next, a sampling method for generating a random number according to each of discrete Gaussian distribution patterns will be described.

Typically, sampling methods as a method for generating a random number according to one-dimensional discrete Gaussian distribution include two methods, an accumulation method and a rejection sampling method. Here, a function that defines one-dimensional discrete Gaussian distribution is $\varphi(x)$, and an output range of the one-dimensional discrete Gaussian distribution is $\{k \in Z | -t \cdot s \leq k \leq t \cdot s\}$.

The above two sampling methods will be described separately for the case where a center of the one-dimensional discrete Gaussian distribution is an origin and the case where a center of the one-dimensional discrete Gaussian distribution is not the origin.

First, a process of generating, using an accumulation method, a random number according to one-dimensional discrete Gaussian distribution the center of which is the origin will be described on the basis of the description of NPL 2. FIG. 9 is a block diagram showing an exemplary configuration of a conventional random number generation system that generates a random number according to one-dimensional discrete Gaussian distribution.

As shown in FIG. 9, a random number generation system 910 that generates a random number according to one-dimensional discrete Gaussian distribution the center of which is the origin includes a storage device 911, a searcher 912, and a uniform random number generator 913.

The following describes operation of the conventional random number generation system 910 including components as shown in FIG. 9 that generates a random number according to one-dimensional discrete Gaussian distribution the center of which is the origin. First, values of $\varphi(0)/2$, $\varphi(1)$, $\varphi(2)$, ..., $\varphi(t \cdot s)$ are computed in advance and stored in the storage device 911. Individual vertical lines in the storage device 911 shown in FIG. 9 represent individual values stored, such as $\varphi(0)/2$ or $\varphi(1)$.

Next, the uniform random number generator 913 outputs a real value $x \in [0,1]$. The output $x \in R$ is input to the searcher 912. The searcher 912 to which x has been input performs binary search for $z \in Z$ that satisfies $\varphi(z-1) \leq x < \varphi(z)$ from among the values stored in the storage device 911.

Next, the searcher 912 uniformly selects a code sign=±. Next, the searcher 912 outputs sign·$z \in Z$ as a random number according to one-dimensional discrete Gaussian distribution. The above is a method, using the accumulation method, for generating a random number according to one-dimensional discrete Gaussian distribution with the origin at the center.

Note that the method for generating the random number according to the one-dimensional discrete Gaussian distribution the center of which is not the origin by the accumulation method, for example, the center being at a, can be a method to replace $\varphi(x)$ with $\varphi(x-a)$ in the method for generating the random number according to the one-dimensional discrete Gaussian distribution the center of which is the origin.

In the accumulation method, the number of pieces of data stored in the storage device is proportional to t·s. The data stored in the storage device when using the one-dimensional discrete Gaussian distribution the center of which is the origin would be $\varphi(0)/2$, $\varphi(1)$, $\varphi(2)$, ..., $\varphi(t \cdot s)$. In contrast, the data when using one-dimensional discrete Gaussian distribution the center of which is a, rather than the origin, would be $\varphi(0-a)/2$, $\varphi(1-a)$, $\varphi(2-a)$, ..., $\varphi(t \cdot s-a)$.

That is, the accumulation method has a problem that using discrete Gaussian distribution having a large variance value s would increase the amount of memory required to store the functional values. In the existing lattice-based cryptography, the variance value s takes a relatively large value.

As a specific amount of memory required for storing the functional values, for example, the values shown in FIG. 10 are described in NPL 4. FIG. 10 is an explanatory diagram showing an example of the amount of memory consumed when the accumulation method is used. As shown in FIG. 10, the larger the variance value, the larger the amount of memory consumed.

The description of "q-type/1 signature" shown in the "center" field of FIG. 10 indicates that the center of $q=2^K$ will be prepared for one signature generation. Similarly, "2-type/1 signature" indicates that only two types of centers will be prepared for one signature generation.

In addition, "Usage" shown in FIG. 10 represents an application in which Gaussian distribution is used by individual methods. For example, in the method "LWE-plane", Gaussian distribution is used for the purpose of "key generation". Furthermore, in the method "GPV" or the like, Gaussian distribution is used for the purpose of "signature generation". When Gaussian distribution is used in the "signature generation" application, the Gaussian distribution is used many times.

In general, lattice-based cryptography such as RSA requires a small amount of computation. Therefore, the lattice-based cryptography is expected to be used in a device having a small computing resource and a small storage capacity, such as a sensor device or a mobile phone.

However, when the accumulation method is used for generation of a random number according to the discrete Gaussian distribution, which is a lattice-based cryptography subroutine, a large amount of storage capacity would be used for storing data used in the accumulation method. That is, there would be a problem of difficulty using the lattice-based cryptography in a device having a small storage capacity.

Next, the rejection sampling method will be described. The rejection sampling method is a method used for generation of a random number according to any discrete probability distribution, not limited to the discrete Gaussian distribution.

First, a rejection sampling method for generating a random number according to discrete probability distribution for a general stochastic variable X will be described on the bases of description of NPL 5. Thereafter, a rejection sampling method for generating a random number according to one-dimensional discrete Gaussian distribution will be described.

In order to generate a random number according to discrete probability distribution $p(X=x_i)$ using the rejection sampling method, a function $t(x)$ that can be efficiently computed is prepared, from among the functions $t(x)$ that satisfy $t(x_i) \geq p(x_i)$ for all $x_i$ values.

Next, a function $r(x)$ in which $t(x)$ is normalized is set as $r(x)=t(x)/\Sigma t(x_i)$. Next, the following procedure is executed to generate a random number according to the discrete probability distribution $p(X=x_i)$ (probability distribution function) for the stochastic variable X by using the rejection sampling method.

(Step 1) Generating a random number Y according to the probability distribution function $r(x)$.

(Step 2) Generating a uniform random number U in an interval [0,1] independently of Y.

(Step 3) When $U \leq p(Y)/t(Y)$ is satisfied, the random number X is set to X=Y. When $U \leq p(Y)/t(Y)$ is not satisfied, the process of (Step 1) will be performed again.

Note that $1/\varepsilon$, g, and f in Algorithm $A_1$ described in NPL 5 are converted to 1, t, and p, respectively, in the above procedure.

Next, a rejection sampling method for generating a random number according to one-dimensional discrete Gaussian distribution will be described on the basis of description of NPL 3. Note that the method described in NPL 3 is a method in which the above-described rejection sampling method is applied to a case where the function t(x) is identically 1.

FIG. 11 shows an exemplary configuration of a device for implementing the method described in NPL 3. FIG. 11 is a block diagram showing another exemplary configuration of a conventional random number generation system that generates a random number according to one-dimensional discrete Gaussian distribution.

As shown in FIG. 11, a random number generation system 920 that generates a random number according to one-dimensional discrete Gaussian distribution the center of which is the origin includes a rejection determiner 921, a uniform random number generator 922, and an output device 923.

The following describes operation of the conventional random number generation system 920 including components as shown in FIG. 11 that generates a random number according to one-dimensional discrete Gaussian distribution the center of which is the origin. First, the uniform random number generator 922 generates a uniform random number $u_1 \in Z$ in a range of $\{k \in Z | -t \cdot s \leq k \leq t \cdot s\}$.

Next, the uniform random number generator 922 generates a real-valued random number $u_2 \in R$ within a range of $[0, \varphi(0)]$. The uniform random number generator 922 inputs the generated $u_1 \in Z$ and $u_2 \in R$ to the rejection determiner 921.

Next, rejection determiner 921 compares $\varphi(u_1)$ with $u_2 \in R$. When the comparison result is $u_2 \leq \varphi(u_1)$, the rejection determiner 921 inputs $u_1 \in Z$ to the output device 923. The output device 923 outputs $u_1 \in Z$ as a random number according to one-dimensional discrete Gaussian distribution the center of which is the origin.

When the comparison result is $u_2 > \varphi(u_1)$, the random number generation system 920 returns to the first step and executes the same operation again. The above is a method, using the rejection sampling method, for generating a random number according to one-dimensional discrete Gaussian distribution with the origin at the center.

Note that the method for generating the random number according to the one-dimensional discrete Gaussian distribution the center of which is not the origin by the rejection sampling method, for example, the center being at a, can be a method to replace $\varphi(x)$ with $\varphi(x-a)$ in the method for generating the random number according to the one-dimensional discrete Gaussian distribution the center of which is the origin.

In the rejection sampling method, when the condition in the process corresponding to the above (Step 3) is not satisfied, the similar process will be repeatedly executed. That is, the rejection sampling method is required to recompute a function that defines the discrete Gaussian distribution every time the generated uniform random number is rejected, leading to a problem of reduction in the computation efficiency.

In summary, the accumulation method has an advantage that the computation cost is low. On the other hand, the accumulation method has a disadvantage that the memory cost is high. The rejection sampling method has an advantage that the memory cost is low. On the other hand, the rejection sampling method has a disadvantage that the computation cost is high.

Next, a method for generating a random number according to discrete Gaussian distribution on a multidimensional lattice will be described on the basis of the description of NPL 3. The following are those prepared before the explanation.

Each of Gram-Schmidt orthogonalized vectors $\tilde{a_1}, \ldots, \tilde{a_n}$ for vectors $\vec{a_1}, \ldots, \vec{a_n}$ is set to a vector computed as follows.

$$\vec{\tilde{a}}_1 = \vec{a}_1$$ [Expression 5]

$$\vec{\tilde{a}}_2 = \vec{a}_2 - \frac{\langle \vec{a}_2, \vec{\tilde{a}}_1 \rangle}{\|\vec{\tilde{a}}_1\|^2} \vec{\tilde{a}}_1$$

$$\vec{\tilde{a}}_3 = \vec{a}_3 - \frac{\langle \vec{a}_3, \vec{\tilde{a}}_2 \rangle}{\|\vec{\tilde{a}}_2\|^2} \vec{\tilde{a}}_2 - \frac{\langle \vec{a}_3, \vec{\tilde{a}}_1 \rangle}{\|\vec{\tilde{a}}_1\|^2} \vec{\tilde{a}}_1$$

$$\vdots$$

$$\vec{\tilde{a}}_n = \vec{a}_n - \sum_{i=1}^{n-1} \frac{\langle \vec{a}_n, \vec{\tilde{a}}_i \rangle}{\|\vec{\tilde{a}}_i\|^2} \vec{\tilde{a}}_i$$

In this specification, symbols "–", "→", "~", etc., which are symbols used in the text should be described just above the previous character. However, due to restrictions on the text notation, these symbols will be written immediately after the character as described above. In the formulas and drawings, these symbols are written in their original positions.

FIG. 12 is an explanatory diagram showing an example of a random number generation algorithm according to discrete Gaussian distribution on a multidimensional lattice. In the loop of the fourth to ninth lines of the algorithm shown in FIG. 12, a random number $z_i$ is generated by one process, and $c_{i-1}$ is updated on the basis of the generated $z_i$. In the next processing, a random number $z_{i-1}$ is generated after the discrete Gaussian distribution is updated on the basis of the updated $c_{i-1}$. That is, a random number $z_n, \ldots, z_1$ are generated sequentially.

In the process on the seventh line of the algorithm shown in FIG. 12, $D_{Z,c'i,\sigma i}$ represents one-dimensional discrete Gaussian distribution having a center $c'_i$ and a variance value $\sigma_1$. Since $c_{i-1}$ is updated in each of processes that constitute the loop, generation of a random number according to the one-dimensional discrete Gaussian distribution with different centers is also required every time.

CITATION LIST

Non Patent Literature

NPL 1: Regev, "On lattices, learning with errors, random linear codes, and cryptography," STOC 2005, ACM, 2005, pages 84-93.
NPL 2: Chris Peikert, "An efficient and parallel Gaussian Sampler for lattices," CRYPTO, 2010, pages 80-97.
NPL 3: Craig Gentry, Chris Peikert, and Vinod Vaikuntanathan, "How to Use a Short Basis: Trapdoors for Hard Lattices and New Cryptographic Constructions," STOC, 2008, pages 197-206.
NPL 4: DWARAKANATH, N. C, GALBRAITH, S. D, "Sampling From Discrete Gaussians for Lattice-Based Cryptography on a Constrained Device," Appl. Algebra Engrg. Comm. Comput. 25, 2014, pages 159-180.

NPL 5: George Casella, Christian P. Robert, and Martin T. Wells, "Generalized Accept-Reject sampling schemes," A Festschrift for Herman Rubin Institute of Mathematical Statistics Lecture Notes—Monograph Series Vol. 45, 2004, pages 342-347.

SUMMARY OF INVENTION

Technical Problem

In the case of generating a random number according to discrete Gaussian distribution on a multidimensional (n-dimensional) lattice, it is required to perform n times of generation of a random number according to discrete Gaussian distribution on a one-dimensional lattice with a center being not necessarily at the origin. The above accumulation method and rejection sampling method are used as a method of generating a random number according to discrete Gaussian distribution on a one-dimensional lattice with a center being not necessarily at the origin.

A problem when generating a random number according to the discrete Gaussian distribution on the multidimensional lattice using the accumulation method and a problem when generating a random number according to the discrete Gaussian distribution on the multidimensional lattice using the rejection sampling method will be described in this order.

In a case where a random number is generated in accordance with the discrete Gaussian distribution on the multidimensional lattice by using the accumulation method, a random number according to the one-dimensional discrete Gaussian distribution is generated by the number of dimensions of the lattice as an output target. In addition, the accumulation method is required to store a new numerical value in the storage device for every different center of the one-dimensional discrete Gaussian distribution used for generating a random number.

Therefore, when there is a substantial difference in each of the centers of a plurality of one-dimensional discrete Gaussian distributions used for generating a random number, a large amount of memory would be consumed. That is, the accumulation method used for generating a random number according to discrete Gaussian distribution on a multidimensional lattice would not be an efficient sampling method in terms of the amount of memory.

A problem when generating a random number according to the discrete Gaussian distribution on a multidimensional lattice using the rejection sampling method is that the generation speed of a random number according to the one-dimensional discrete Gaussian distribution is low. The reason is that, every time the generated uniform random number is rejected, computation of a function that defines discrete Gaussian distribution is required, lowering the overall computation efficiency.

Object of the Invention

In view of the above, the present invention provides a random number generation method selecting system, a random number generation method selecting method, and a random number generation method selecting program, for solution of the problems, that can further reduce the memory cost and the computation cost for generating a random number according to discrete Gaussian distribution on a multidimensional lattice.

Solution to Problem

A random number generation method selecting system according to the present invention is a random number generation method selecting system that generates a random number according to a first discrete distribution, which is a discrete Gaussian distribution on a one-dimensional lattice the center of which is a positive value, the random number generation method selecting system including: a generation means which generates a uniform random number between 0 and a first probability, which is a probability of a stochastic variable becoming a value within a predetermined interval in a positive range in the first discrete distribution; and a selection means, when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selects, as a random number generation method, an accumulation method in which a functional value defining the second discrete distribution is used, when a uniform random number greater than the second probability is generated, selects a rejection sampling method as the random number generation method.

A random number generation method selecting method according to the present invention is a random number generation method selecting method to be executed in a random number generation method selecting system that generates a random number according to a first discrete distribution, which is a discrete Gaussian distribution on a one-dimensional lattice the center of which is a positive value, the random number generation method selecting method including: generating a uniform random number between 0 and a first probability, which is a probability of a stochastic variable becoming a value within a predetermined interval in a positive range in the first discrete distribution; when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selecting, as a random number generation method, an accumulation method in which a functional value defining the second discrete distribution is used; and when a uniform random number greater than the second probability is generated, selecting a rejection sampling method as the random number generation method.

A random number generation method selecting program according to the present invention is a random number generation method selecting program that is executed on a computer that generates a random number according to a first discrete distribution, which is a discrete Gaussian distribution on a one-dimensional lattice the center of which is a positive value, the random number generation method selecting program causing the computer to execute: a generation process that generates a uniform random number between 0 and a first probability, which is a probability of a stochastic variable becoming a value within a predetermined interval in a positive range in the first discrete distribution; a first selection process that, when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selects, as a random number generation method, an accumulation method in which a functional value defining the second discrete distribution is used; and a second selection process that, when a uniform random number greater than the second probability is generated, selects a rejection sampling method as the random number generation method.

Advantageous Effects of Invention

According to the present invention, it is possible to further reduce the memory cost and the computation cost for generating a random number according to discrete Gaussian distribution on a multidimensional lattice.

BRIEF DESCRIPTION OF DRAWINGS

FIG. 10 is an explanatory diagram showing an example of the amount of memory consumed when the accumulation method is used.

FIG. 11 is a block diagram showing another exemplary configuration of a conventional random number generation system that generates a random number according to one-dimensional discrete Gaussian distribution.

FIG. 12 is an explanatory diagram showing an example of a random number generation algorithm according to discrete Gaussian distribution on a multidimensional lattice.

DESCRIPTION OF EMBODIMENTS

First Exemplary Embodiment

Hereinafter, exemplary embodiments of the present invention will be described with reference to the drawings. In the present exemplary embodiment, it is assumed that one-dimensional discrete Gaussian distribution the center of which is the origin is virtually converted into one-dimensional discrete Gaussian distribution the center of which is not the origin by the following method.

Figure 1:
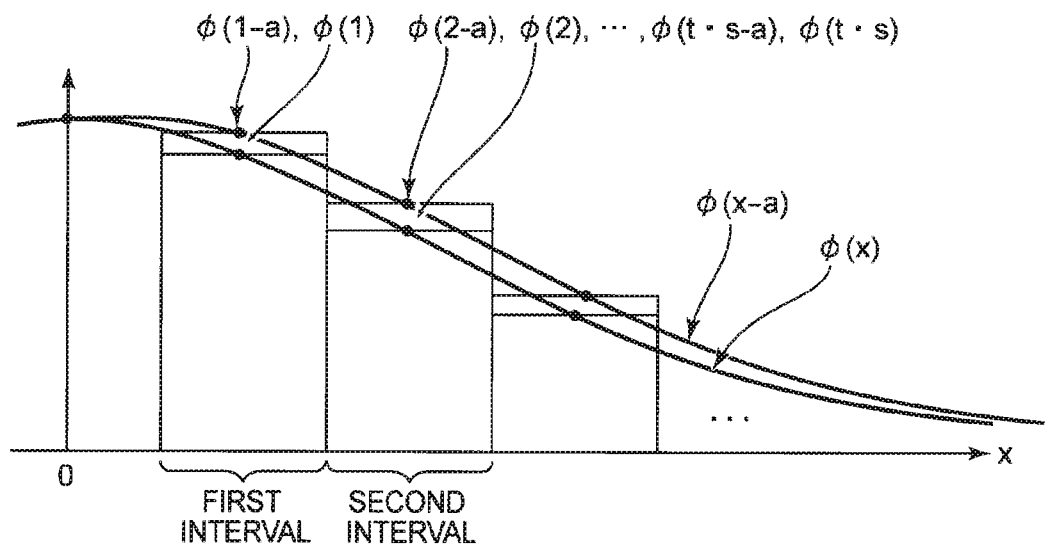
FIG. 1 is an explanatory diagram showing one-dimensional discrete Gaussian distribution the center of which is an origin and one-dimensional discrete Gaussian distribution the center of which is not the origin.

FIG. 1 is an explanatory diagram showing one-dimensional discrete Gaussian distribution the center of which is the origin and one-dimensional discrete Gaussian distribution the center of which is not the origin. For simplification, FIG. 1 shows only a positive range of an output range of the one-dimensional discrete Gaussian distribution. As shown in FIG. 1, since the one-dimensional discrete Gaussian distribution is a line-symmetric distribution, it is sufficient as long as the positive range of the output range is considered.

Referring to FIG. 1, it is observed that most of the one-dimensional discrete Gaussian distribution with a center at a rather than at the origin is included in the one-dimensional discrete Gaussian distribution the center of which is the origin. For example, probability $\varphi(1)$ in a first interval shown in FIG. 1 (for convenience, the length of the horizontal axis is 1) covers most of probability $\varphi(1-a)$.

Similarly, probability $\varphi(2)$ in a second interval shown in FIG. 1 (for convenience, the length of the horizontal axis is 1) covers most of probability $\varphi(2-a)$. Hereinbelow, similar characteristics can be observed in all intervals.

That is, the random number in the first interval according to the one-dimensional discrete Gaussian distribution the center of which is not the origin is considered to be a random number according to the one-dimensional discrete Gaussian distribution the center of which is the origin with the probability of $\varphi(1)/\varphi(1-a)$. The present exemplary embodiment utilizes the above characteristic.

Figure 2:
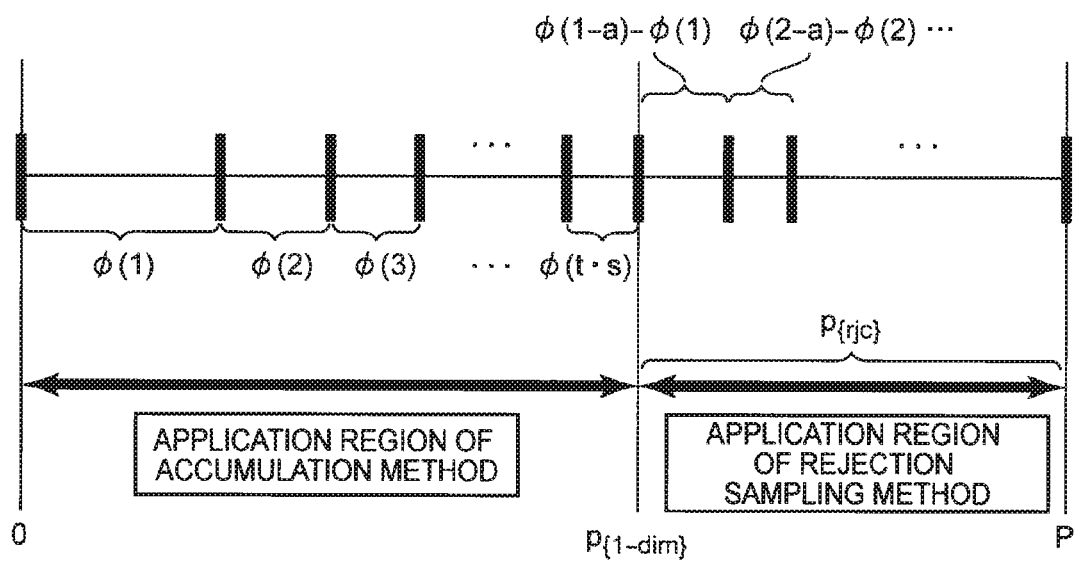
FIG. 2 is an explanatory diagram showing a region to which an accumulation method is applied and a region to which a rejection sampling method is applied.

FIG. 2 is an explanatory diagram showing a region to which an accumulation method is applied and a region to which a rejection sampling method is applied. Probability P shown in FIG. 2 is a sum of the probability $\varphi(1-a)$, . . . , probability $\varphi(t \cdot s - a)$. That is, the probability P is probability that a random number is output in accordance with one-dimensional discrete Gaussian distribution the center of which is not the origin.

In addition, as shown in FIG. 2, probability $p_{\{1-dim\}}$ is a sum of probability $\varphi(1)$, . . . , probability $\varphi(t \cdot s)$. That is, the probability $p_{\{1-dim\}}$ is probability that a random number is output in accordance with one-dimensional discrete Gaussian distribution the center of which is the origin.

In a case where a uniform random number r taken in an interval [0, P] is $p_{\{1-dim\}}$ or less, the random number generation system according to the present exemplary embodiment generates a random number according to the one-dimensional discrete Gaussian distribution the center of which is not the origin by the accumulation method using a value of the function $\varphi(x)$ that defines one-dimensional discrete Gaussian distribution the center of which is the origin.

Furthermore, as shown in FIG. 2, probability $p_{\{rjc\}}$ is a sum of probability $\{(\varphi(1-a)-\varphi(1)\}, \ldots,$ probability $\{\varphi(t \cdot s-a)-\varphi(t \cdot s)\}$. That is, the probability $p_{\{rjc\}}$ is a difference between the probability P that a random number is output in accordance with one-dimensional discrete Gaussian distribution the center of which is not the origin and the probability $p_{\{1-dim\}}$ that a random number is output in accordance with one-dimensional discrete Gaussian distribution the center of which is the origin.

In a case where the uniform random number r taken in the interval [0, P] is larger than $p_{\{1-dim\}}$, the random number generation system of the present exemplary embodiment generates, by the rejection sampling method, the random number according to the one-dimensional discrete Gaussian distribution the center of which is not the origin.

Since the probability $p_{\{1-dim\}}$ is sufficiently larger than the probability $p_{\{rjc\}}$, the probability that a random number will be generated by the rejection sampling method is low. That is, since the chance of generating a random number by the rejection sampling method is reduced, the overall computation cost for generating a random number is reduced.

In addition, since the accumulation method always uses the value of the function $\varphi(x)$ that defines the one-dimensional discrete Gaussian distribution the center of which is the origin, it is sufficient as long as the value of the function $\varphi(x)$ is stored in the storage device. That is, the overall memory cost for generating a random number will also be reduced.

The above has described the method of generating a random number according to one-dimensional discrete Gaussian distribution having the center shifted from the origin to the right. However, a random number according to one-dimensional discrete Gaussian distribution having the center shifted from the origin to the left are generated in a similar manner. The random number generation system according to the present exemplary embodiment virtually converts the center of the discrete Gaussian distribution on the one-dimensional lattice and thereby efficiently generates a random number according to the discrete Gaussian distribution on the multidimensional lattice.

Description of Configuration

Figure 3:
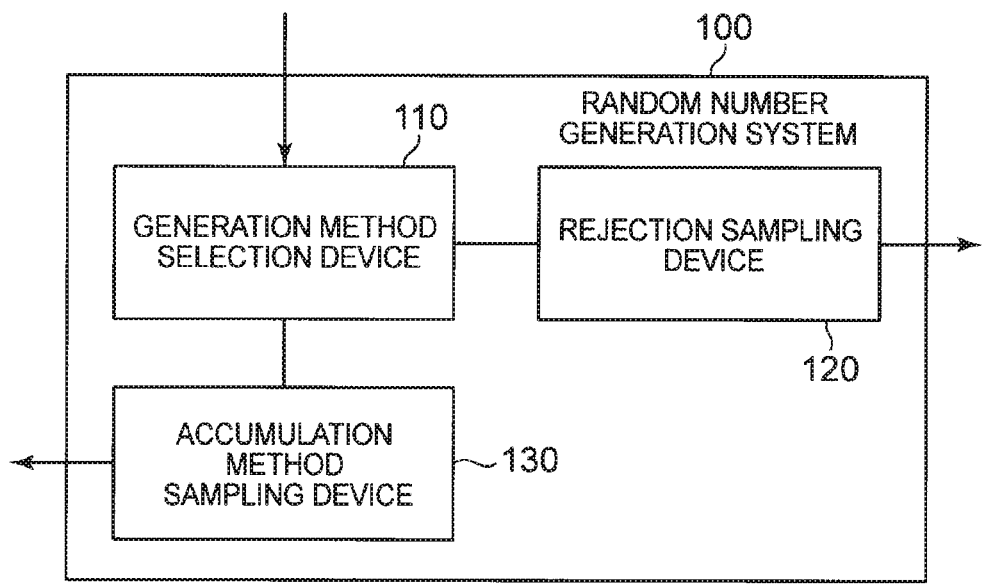
FIG. 3 is a block diagram showing an exemplary configuration of a random number generation system according to a first exemplary embodiment of the present invention.

FIG. 3 is a block diagram showing an exemplary configuration of a random number generation system according to a first exemplary embodiment of the present invention. As shown in FIG. 3, a random number generation system 100 of the present exemplary embodiment includes a generation method selection device 110, a rejection sampling device 120, and an accumulation method sampling device 130.

Figure 4:
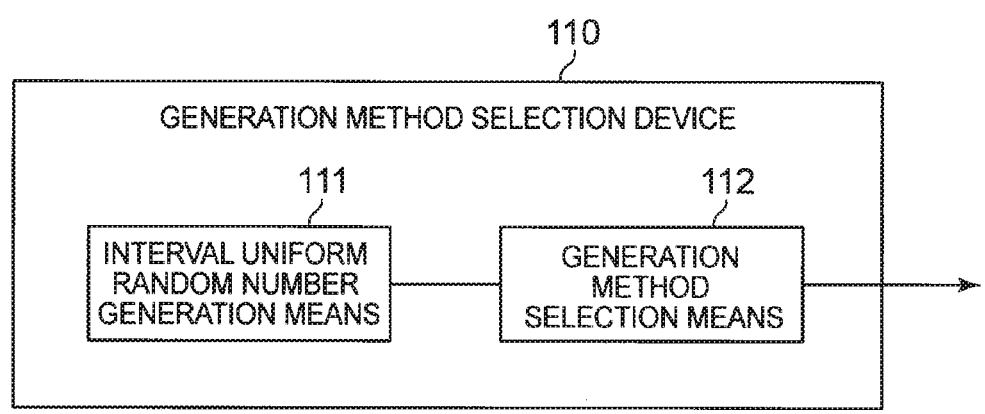
FIG. 4 is a block diagram showing an exemplary configuration of a generation method selection device 110 according to the first exemplary embodiment.

FIG. 4 is a block diagram showing an exemplary configuration of the generation method selection device 110 according to the first exemplary embodiment. As shown in FIG. 4, the generation method selection device 110 of the present exemplary embodiment includes an interval uniform random number generation means 111 and a generation method selection means 112.

The interval uniform random number generation means 111 has a function of generating a uniform random number r in the interval [0, P]. Furthermore, the generation method selection means 112 has a function of selecting a random number generation method after comparing the generated uniform random number r and the probability $p_{\{1-dim\}}$.

In a case where the uniform random number r is probability $p_{\{1-dim\}}$ or less, the generation method selection means 112 selects the accumulation method as the random number generation method. After the selection, the generation method selection means 112 instructs the accumulation method sampling device 130 to generate a random number.

In addition, in a case where the uniform random number r is larger than the probability $p_{\{1-dim\}}$, the generation method selection means 112 selects the rejection sampling method as the random number generation method. After the selection, the generation method selection means 112 instructs the rejection sampling device 120 to generate a random number.

Figure 5:
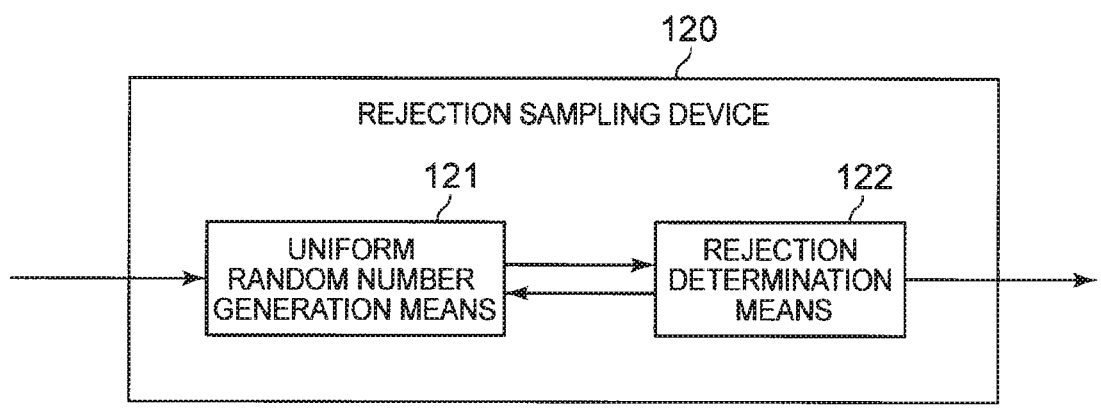
FIG. 5 is a block diagram showing an exemplary configuration of a rejection sampling device 120 according to the first exemplary embodiment.

FIG. 5 is a block diagram showing an exemplary configuration of the rejection sampling device 120 according to the first exemplary embodiment. As shown in FIG. 5, the rejection sampling device 120 of the present exemplary embodiment includes a uniform random number generation means 121 and a rejection determination means 122.

The function of the uniform random number generation means 121 is similar to the function of the uniform random number generator 922. That is, the uniform random number generation means 121 generates a uniform random number $u_1 \in Z$ within a range of $\{k \in Z | -(t \cdot s-a) \leq k \leq (t \cdot s-a)\}$.

Next, the uniform random number generation means 121 generates a real-valued random number $u_2 \in R$ within a range of $[0, \varphi(-a)]$. The uniform random number generation means 121 inputs the generated $u_1 \in Z$ and $u_2 \in R$ to the rejection determination means 122.

The function of rejection determination means 122 is similar to the function of rejection determiner 921 and the function of output device 923. That is, rejection determination means 122 compares $\varphi(u_1-a)$ and $u_2 \in R$. When $u_2 \leq \varphi(u_1-a)$ is satisfied as a result of the comparison, the rejection determination means 122 outputs $u_1 \in Z$ as a random number according to one-dimensional discrete Gaussian distribution the center of which is not the origin.

When $u_2 > \varphi(u_1-a)$ is satisfied as a result of the comparison, the rejection determination means 122 returns to the first step and executes the same operation again.

Figure 6:
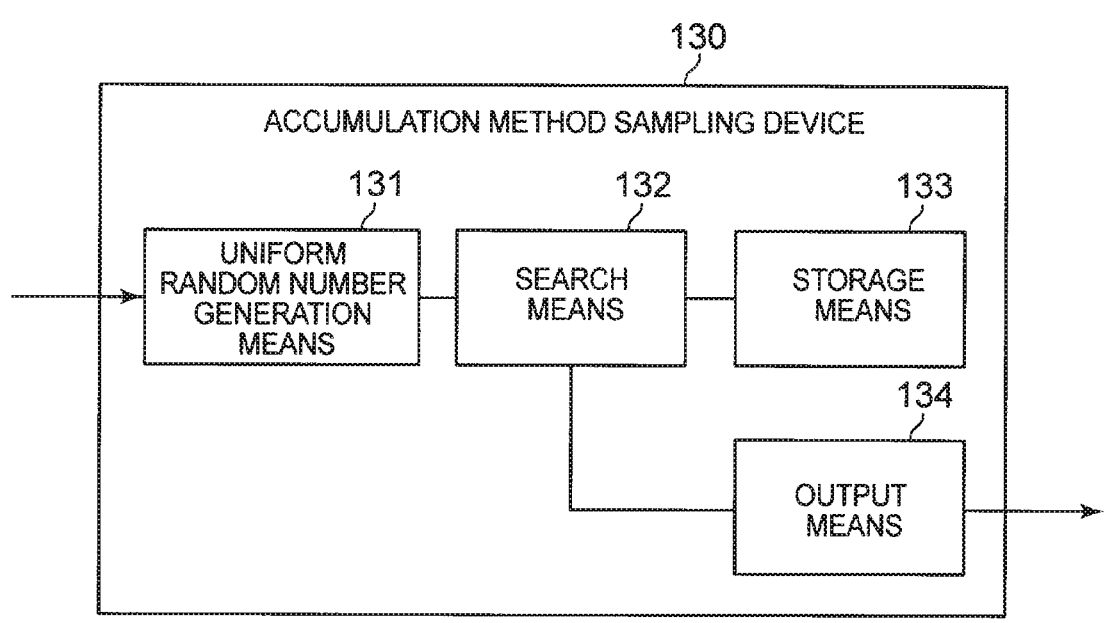
FIG. 6 is a block diagram showing an exemplary configuration of an accumulation method sampling device 130 according to the first exemplary embodiment.

FIG. 6 is a block diagram showing an exemplary configuration of the accumulation method sampling device 130 according to the first exemplary embodiment. As shown in FIG. 6, the accumulation method sampling device 130 of the present exemplary embodiment includes a uniform random number generation means 131, a search means 132, a storage means 133, and an output means 134.

The function of the uniform random number generation means 131 is similar to the function of the uniform random number generator 913. That is, the uniform random number generation means 131 outputs a real value $x \in [0,1]$.

Furthermore, the function of the search means 132 is similar to the function of the searcher 912. That is, the search means 132 performs binary search for $z \in Z$ that satisfies $\varphi(z-a-1) \leq x < \varphi(z-a)$ from among the values stored in the storage means 133.

Furthermore, the function of the storage means 133 is similar to the function of the storage device 911. That is, the storage means 133 stores the values of $\varphi(0-a)/2$, $\varphi(1-a)$, $\varphi(2-a)$, ..., $\varphi(t \cdot s-a)$.

The output means 134 has a function of outputting the random number searched by the search means 132 as a random number according to one-dimensional discrete Gaussian distribution the center of which is not the origin.

The random number generation system 100 of the present exemplary embodiment is capable of generating a random number according to the discrete Gaussian distribution on the multidimensional lattice at a memory cost for generating a random number according to one-dimensional discrete Gaussian distribution by the accumulation method, and at a computation cost close to the computation cost when each of the sampling processes is executed by the accumulation method.

Description of Operation

Figure 7:
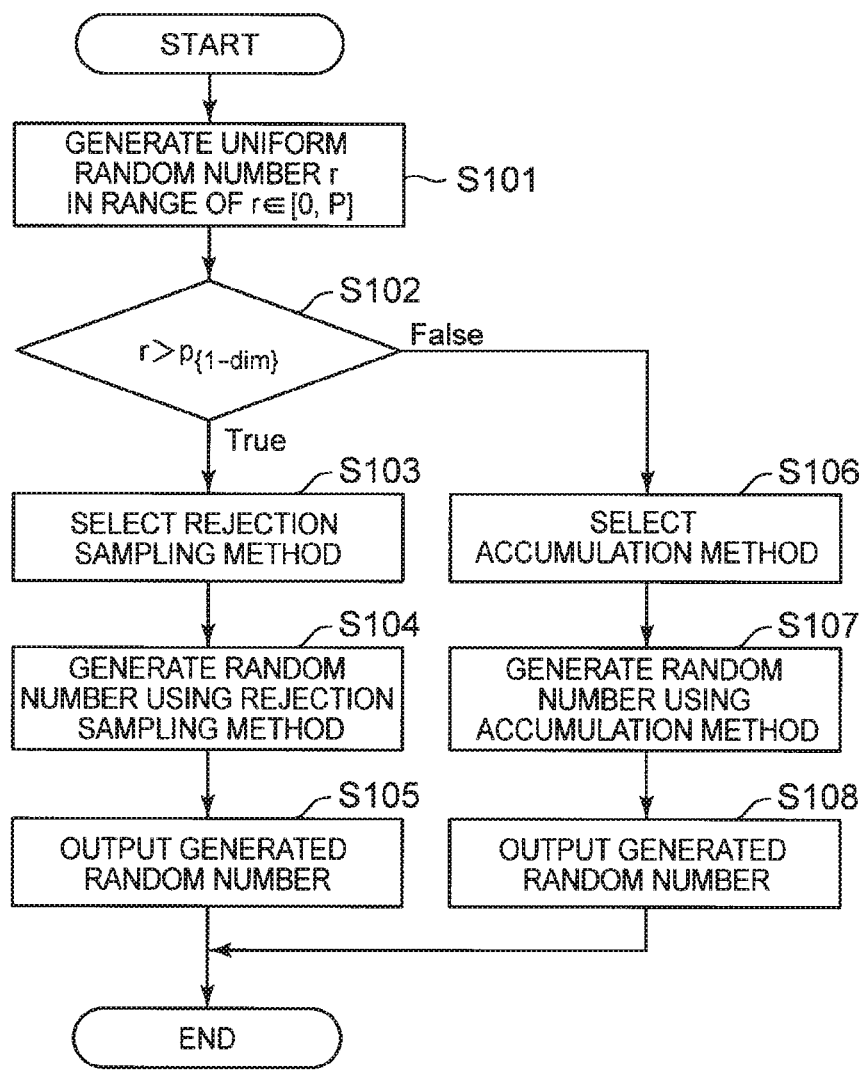
FIG. 7 is a flowchart showing an operation of a random number generation process performed by a random number generation system 100 of the first exemplary embodiment.

Hereinafter, operation of the random number generation system 100 according to the present exemplary embodiment to generate a random number according to one-dimensional discrete Gaussian distribution the center of which is not the origin will be described with reference to FIG. 7. FIG. 7 is a flowchart showing an operation of a random number generation process performed by the random number generation system 100 of the first exemplary embodiment.

First, the interval uniform random number generation means 111 generates a uniform random number r in the interval [0, P] (step S101). The interval uniform random number generation means 111 inputs the generated uniform random number r to the generation method selection means 112.

Next, the generation method selection means 112 determines whether the input uniform random number r is larger than the probability $p_{\{1\text{-}dim\}}$ (step S102).

In a case where the uniform random number r is larger than the probability $p_{\{1\text{-}dim\}}$ (True in step S102), the generation method selection means 112 selects the rejection sampling method as a random number sampling processing method (step S103). Next, the generation method selection means 112 instructs the rejection sampling device 120 to generate a random number.

After instructed to generate a random number, the rejection sampling device 120 generates a random number according to one-dimensional discrete Gaussian distribution the center of which is not the origin by the rejection sampling method (step S104). After the generation, the rejection sampling device 120 outputs the generated random number (step S105). After the output, the random number generation system 100 finishes the random number generation process.

In a case where the uniform random number r is the probability $p_{\{1\text{-}dim\}}$ or less (False in step S102), the generation method selection means 112 selects the accumulation method as a random number sampling processing method (step S106). Next, the generation method selection means 112 instructs the accumulation method sampling device 130 to generate a random number.

After instructed to generate a random number, the accumulation method sampling device 130 generates a random number according to one-dimensional discrete Gaussian distribution the center of which is not the origin by the accumulation method (step S107). The accumulation method sampling device 130 generates a random number by the accumulation method that uses a functional value defining one-dimensional discrete Gaussian distribution the center of which is the origin.

After the generation, the accumulation method sampling device 130 outputs the generated random number (step S108). After the output, the random number generation system 100 finishes the random number generation process. In a case where a random number according to the discrete Gaussian distribution on the n-dimensional lattice is generated, the random number generation system 100 executes the random number generation process shown in FIG. 7 n times.

Description of Effects

Since the value of the probability $p_{\{1\text{-}dim\}}$ is sufficiently larger than the value of the probability $p_{\{rjc\}}$, the generation method selection means 112 selects, in most cases, the accumulation method that uses a functional value defining one-dimensional discrete Gaussian distribution the center of which is the origin, as the random number generation method. That is, when the random number generation system 100 of the present exemplary embodiment is used, the sampling process that is executed every time a random number according to discrete Gaussian distribution on a multidimensional lattice is generated, is performed, with high probability, as the sampling process using the accumulation method.

Therefore, the memory cost required for the entire random number generation process by the random number generation system 100 will be reduced to a value of a degree substantially the same as the memory cost required when the random number according to the one-dimensional discrete Gaussian distribution the center of which is the origin is generated by the accumulation method.

Furthermore, the computation cost required for the entire random number generation process by the random number generation system 100 is reduced to a value close to the computation cost required when the sampling process executed every time is the sampling process performed by the accumulation method.

Note that the random number generation system 100 of the present exemplary embodiment may be implemented by a processor such as a central processing unit (CPU) or a data processing device that executes processing according to a program stored in a non-transitory storage medium, for example. That is, the interval uniform random number generation means 111, the generation method selection means 112, the uniform random number generation means 121, the rejection determination means 122, the uniform random number generation means 131, the search means 132, and the output means 134 may be implemented by a CPU that executes processes in accordance with a program control, for example.

The storage means 133 may be implemented by random access memory (RAM), for example.

In addition, individual components in the random number generation system 100 according to the present exemplary embodiment may be implemented by a hardware circuit. As an example, the interval uniform random number generation means 111, the generation method selection means 112, the uniform random number generation means 121, the rejection determination means 122, the uniform random number generation means 131, the search means 132, the storage means 133, and the output means 134 may be implemented by individual large scale integration (LSI) devices. Alternatively, they may be implemented by one LSI device.

Figure 8:
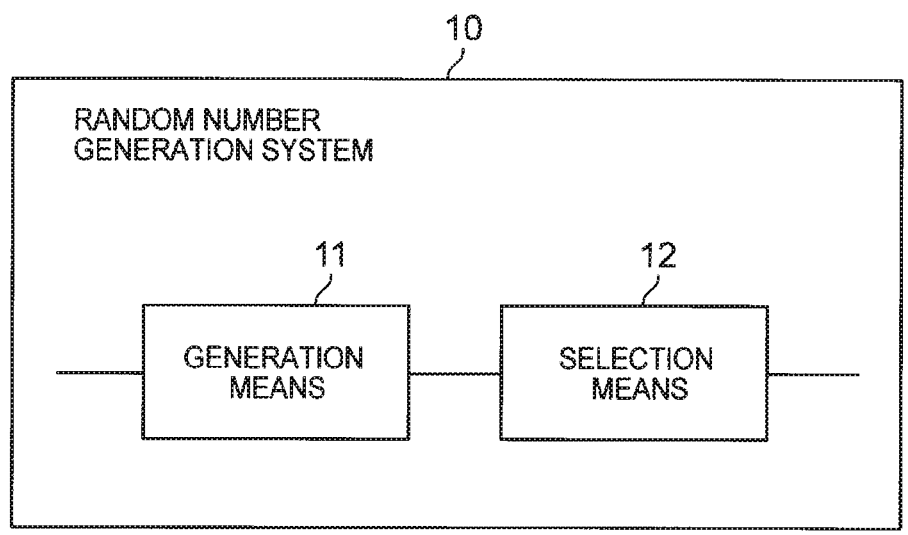
FIG. 8 is a block diagram showing a summary of a random number generation system according to the present invention.
Figure 9:
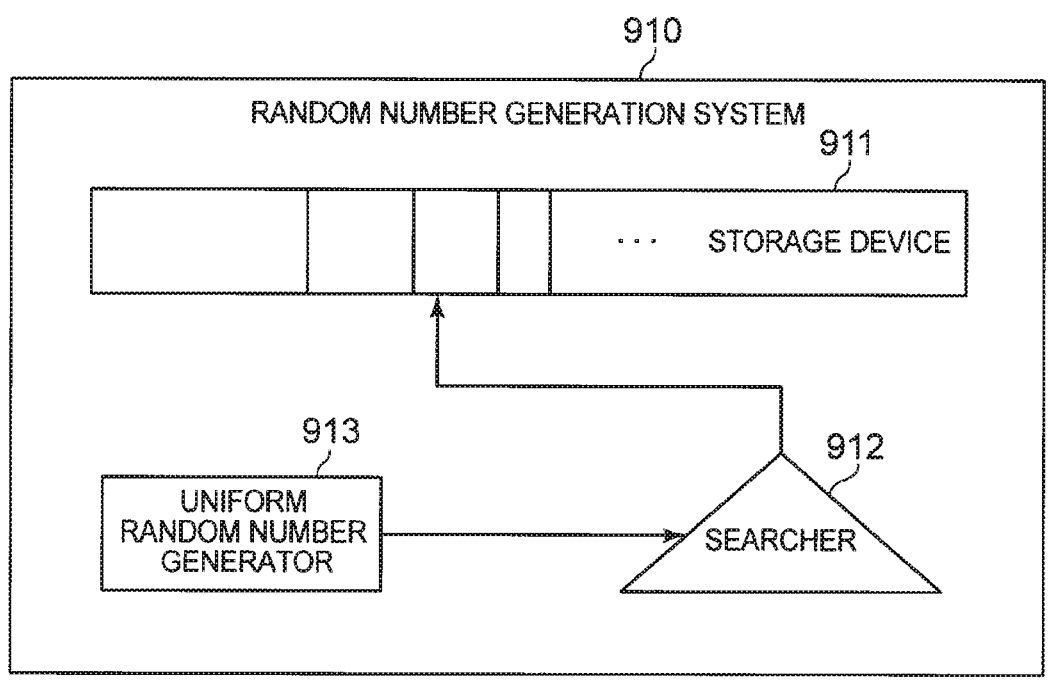
FIG. 9 is a block diagram showing an exemplary configuration of a conventional random number generation system that generates a random number according to one-dimensional discrete Gaussian distribution.

Next, a summary of the present invention will be described. FIG. 8 is a block diagram showing a summary of a random number generation system according to the present invention. The random number generation system 10 according to the present invention is a random number generation system that generates a random number according to a first discrete distribution, which is a discrete Gaussian distribution on a one-dimensional lattice the center of which is a positive value, the random number generation system 10 including: a generation means 11 (for example, the interval uniform random number generation means 111) which generates a uniform random number between 0 and a first probability, which is a probability of a stochastic variable becoming a value within a predetermined interval in a positive range in the first discrete distribution; and a selection means 12 (for example, the generation method selection means 112), when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selects, as a random number generation method, an accumulation method in which a functional value defining the second discrete distribution is used, when a uniform random number greater than the second probability is generated, selects a rejection sampling method as the random number generation method.

With such a configuration, the random number generation system can further reduce the memory cost and computation cost for generating a random number according to discrete Gaussian distribution on a multidimensional lattice.

Furthermore, the random number generation system 10 may include an accumulation method generation means (for example, the accumulation method sampling device 130)

which generates a random number according to the discrete Gaussian distribution on the one-dimensional lattice by the accumulation method that uses the functional value defining the second discrete distribution, the selection means 12 may instruct the accumulation method generation means to generate a random number after the accumulation method is selected, and the accumulation method generation means may generate a random number in response to the instruction. Furthermore, the accumulation method generation means may include a storage means (for example, the storage means 133) which stores the functional value defining the second discrete distribution.

With such a configuration, the random number generation system can generate, by the accumulation method, a random number according to discrete Gaussian distribution on a one-dimensional lattice the center of which is not the origin.

Furthermore, the random number generation system 10 may include a rejection sampling method generation means (for example, the rejection sampling device 120) which generates a random number according to the discrete Gaussian distribution on the one-dimensional lattice by the rejection sampling method, the selection means 12 may instruct the rejection sampling method generation means to generate a random number after the rejection sampling method is selected, and the rejection sampling method generation means may generate a random number in response to the instruction.

With such a configuration, the random number generation system can generate, by the rejection sampling method, a random number according to discrete Gaussian distribution on a one-dimensional lattice the center of which is not the origin.

While the invention of the present application has been described with reference to the exemplary embodiments and examples, the invention of the present application is not limited to the above exemplary embodiments and examples. Configuration and details of the invention of the present application can be modified in various manners understandable for those skilled in the art within the scope of the invention of the present application.

The above exemplary embodiments may also be partially or entirely described as the following appendices, although this is not a limitation.

(Supplementary Note 1)

A random number generation system that generates a random number according to a third discrete distribution, which is a discrete Gaussian distribution on a one-dimensional lattice the center of which is a negative value, the random number generation system including: a generation means which generates a uniform random number between 0 and a third probability, which is a probability of a stochastic variable becoming a value within a predetermined interval in a negative range in the third discrete distribution; and a selection means, when a uniform random number less than or equal to a fourth probability is generated, the fourth probability being a probability of the stochastic variable becoming a value within a predetermined interval in a fourth discrete distribution, which is a discrete Gaussian distribution on a one-dimensional lattice the center of which is the origin, selects, as a random number generation method, an accumulation method in which a functional value defining the fourth discrete distribution is used, when a uniform random number greater than the fourth probability is generated, selects a rejection sampling method as the random number generation method.

(Supplementary Note 2)

The random number generation system according to Supplementary note 1, further including an accumulation method generation means which generates a random number according to the discrete Gaussian distribution on the one-dimensional lattice by the accumulation method that uses the functional value defining the fourth discrete distribution, in which the selection means instructs the accumulation method generation means to generate a random number after the accumulation method is selected, and the accumulation method generation means generates a random number in response to the instruction.

(Supplementary Note 3)

The random number generation system according to Supplementary note 2, in which the accumulation method generation means includes a storage means which stores the functional value defining the fourth discrete distribution.

(Supplementary Note 4)

The random number generation system according to any one of Supplementary notes 1 to 3, further including a rejection sampling method generation means which generates a random number according to the discrete Gaussian distribution on the one-dimensional lattice by the rejection sampling method, in which the selection means instructs the rejection sampling method generation means to generate a random number after the rejection sampling method is selected, and the rejection sampling method generation means generates a random number in response to the instruction.

(Supplementary Note 5)

A random number generation method to be executed in a random number generation system that generates a random number according to a third discrete distribution, which is a discrete Gaussian distribution on a one-dimensional lattice the center of which is a negative value, the random number generation method including: generating a uniform random number between 0 and a third probability, which is a probability of a stochastic variable becoming a value within a predetermined interval in a negative range in the third discrete distribution; when a uniform random number less than or equal to a fourth probability is generated, the fourth probability being a probability of the stochastic variable becoming a value within a predetermined interval in a fourth discrete distribution, which is a discrete Gaussian distribution on a one-dimensional lattice the center of which is the origin, selecting, as a random number generation method, an accumulation method in which a functional value defining the fourth discrete distribution is used; and when a uniform random number greater than the fourth probability is generated, selecting a rejection sampling method as the random number generation method.

(Supplementary Note 6)

A random number generation program executed on a computer that generates a random number according to a third discrete distribution, which is a discrete Gaussian distribution on a one-dimensional lattice the center of which is a negative value, the random number generation program causing the computer to execute: a generation process that generates a uniform random number between 0 and a third probability, which is a probability of a stochastic variable becoming a value within a predetermined interval in a negative range in the third discrete distribution; a third selection process that, when a uniform random number less than or equal to a fourth probability is generated, the fourth probability being a probability of the stochastic variable becoming a value within a predetermined interval in a fourth discrete distribution, which is a discrete Gaussian distribution on a one-dimensional lattice the center of which is the origin, selects, as a random number generation method, an accumulation method in which a functional value defining the fourth discrete distribution is used; and a fourth selection process that, when a uniform random number greater than the fourth probability is generated, selects a rejection sampling method as the random number generation method.

REFERENCE SIGNS LIST 010, 100, 910, 920 Random number generation system
11 Generation means
12 Selection means
110 Generation method selection device
111 Interval uniform random number generation means
112 Generation method selection means
120 Rejection sampling device
121, 131 Uniform random number generation means
122 Rejection determination means
130 Accumulation method sampling device
132 Search means
133 Storage means
134 Output means
911 Storage device
912 Searcher
913, 922 Uniform random number generator
921 Rejection determiner
923 Output device

What is claimed is:

1. A random number generation method selecting system that generates a random number according to a first discrete distribution, which is a discrete Gaussian distribution on a one-dimensional lattice the center of which is a positive value, the random number generation method selecting system comprising:
a generation unit, implemented by a hardware including one or more processors, which generates a uniform random number between 0 and a first probability, which is a probability of a stochastic variable becoming a value within a predetermined interval in a positive range in the first discrete distribution; and
a selection unit, implemented by the hardware, when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selects, as a random number generation method, an accumulation method in which a functional value defining the second discrete distribution is used, when a uniform random number greater than the second probability is generated, selects a rejection sampling method as the random number generation method.

2. The random number generation method selecting system according to claim 1, further comprising
an accumulation method generation unit, implemented by the hardware, which generates a random number according to the discrete Gaussian distribution on the one-dimensional lattice by the accumulation method that uses the functional value defining the second discrete distribution,
wherein the selection unit instructs the accumulation method generation unit to generate a random number after the accumulation method is selected, and
the accumulation method generation unit generates a random number in response to the instruction.

3. The random number generation method selecting system according to claim 2,
wherein the accumulation method generation unit includes a storage unit, implemented by the hardware, which stores the functional value defining the second discrete distribution.

4. The random number generation method selecting system according to claim 1, further comprising
a rejection sampling method generation unit, implemented by the hardware, which generates a random number according to the discrete Gaussian distribution on the one-dimensional lattice by the rejection sampling method,
wherein the selection unit instructs the rejection sampling method generation unit to generate a random number after the rejection sampling method is selected, and
the rejection sampling method generation unit generates a random number in response to the instruction.

5. The random number generation method selecting system according to claim 2, further comprising
a rejection sampling method generation unit, implemented by the hardware, which generates a random number according to the discrete Gaussian distribution on the one-dimensional lattice by the rejection sampling method,
wherein the selection unit instructs the rejection sampling method generation unit to generate a random number after the rejection sampling method is selected, and
the rejection sampling method generation unit generates a random number in response to the instruction.

6. The random number generation method selecting system according to claim 3, further comprising
a rejection sampling method generation unit, implemented by the hardware, which generates a random number according to the discrete Gaussian distribution on the one-dimensional lattice by the rejection sampling method,
wherein the selection unit instructs the rejection sampling method generation unit to generate a random number after the rejection sampling method is selected, and
the rejection sampling method generation unit generates a random number in response to the instruction.

7. A computer-implemented random number generation method selecting method to be executed in a random number generation method selecting system that generates a random number according to a first discrete distribution, which is a discrete Gaussian distribution on a one-dimensional lattice the center of which is a positive value, the random number generation method selecting method comprising:
generating a uniform random number between 0 and a first probability, which is a probability of a stochastic variable becoming a value within a predetermined interval in a positive range in the first discrete distribution;
when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selecting, as a random number generation method, an accumulation method in which a functional value defining the second discrete distribution is used; and
when a uniform random number greater than the second probability is generated, selecting a rejection sampling method as the random number generation method.

8. A non-transitory computer-readable capturing medium having captured therein a random number generation method selecting program executed on a computer that generates a random number according to a first discrete distribution, which is a discrete Gaussian distribution on a one-dimensional lattice the center of which is a positive value, the random number generation method selecting program causing the computer to execute:
- a generation process that generates a uniform random number between 0 and a first probability, which is a probability of a stochastic variable becoming a value within a predetermined interval in a positive range in the first discrete distribution;
- a first selection process that, when a uniform random number less than or equal to a second probability is generated, the second probability being a probability of the stochastic variable becoming a value within a predetermined interval in a second discrete distribution, which is a discrete Gaussian distribution on a one-dimensional lattice the center of which is the origin, selects, as a random number generation method, an accumulation method in which a functional value defining the second discrete distribution is used; and
- a second selection process that, when a uniform random number greater than the second probability is generated, selects a rejection sampling method as the random number generation method.

* * * * *